Jan. 31, 1950  A. A. HOPEMAN, JR., ET AL  2,496,006
CONVERTIBLE BED AND SEAT
Filed Dec. 28, 1945  6 Sheets-Sheet 6
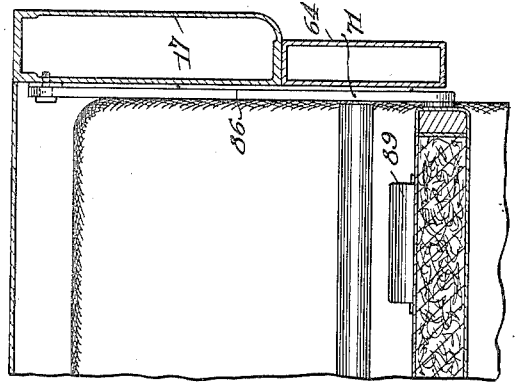
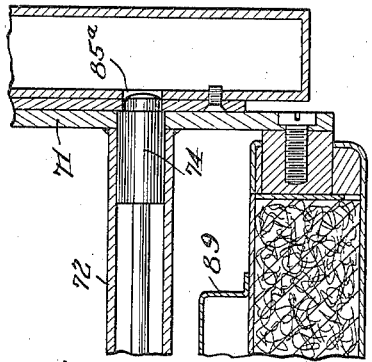
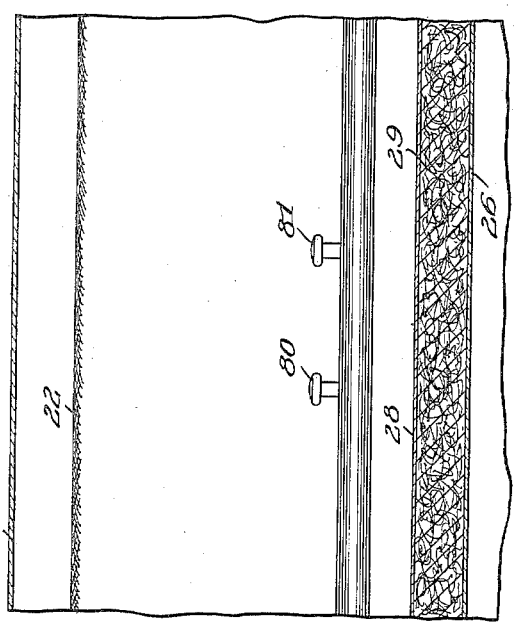
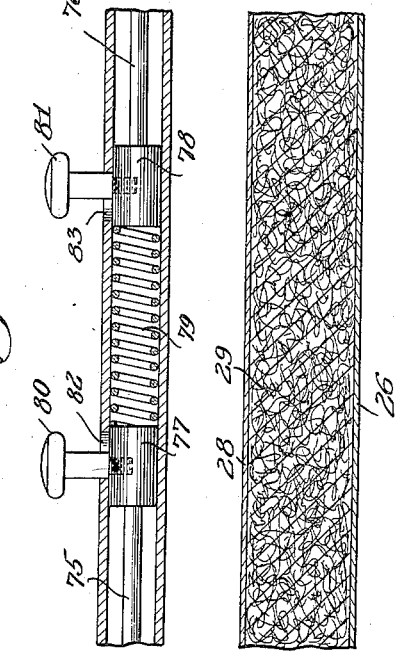
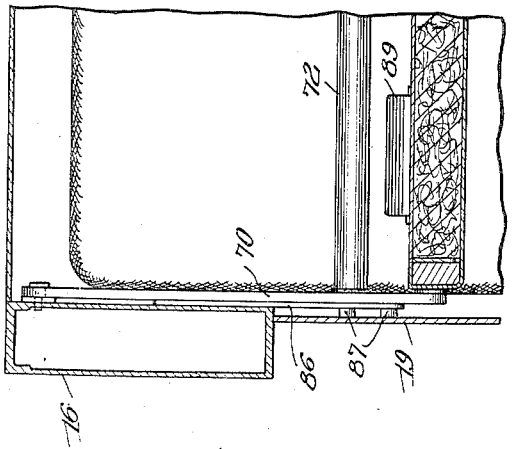
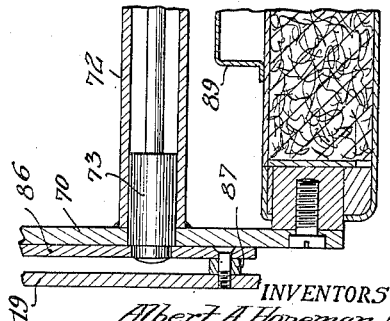
INVENTORS
Albert A. Hopeman, Jr.
John A. Bohnsack
BY Edward H. Cumpston
their Attorney Patented Jan. 31, 1950

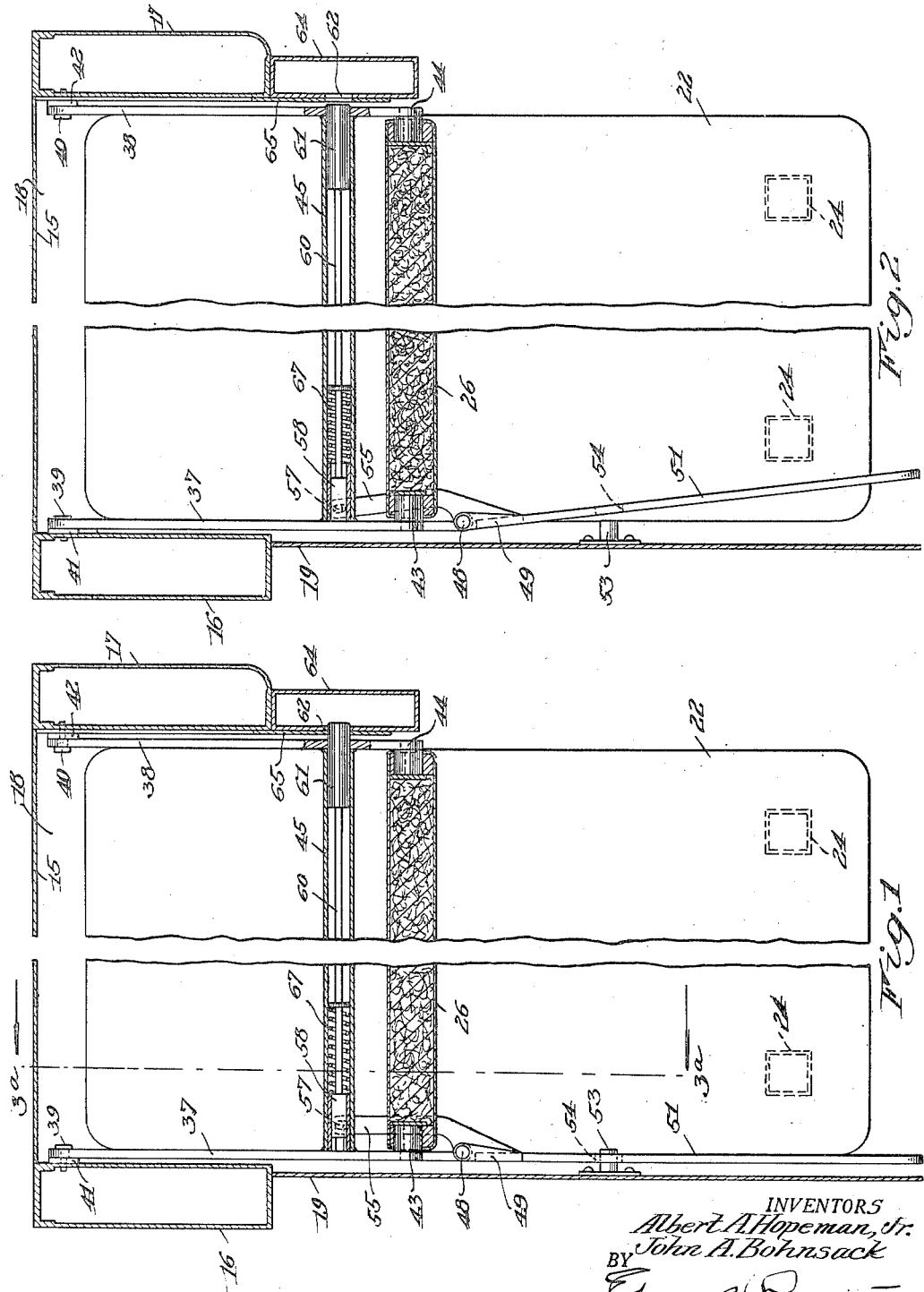

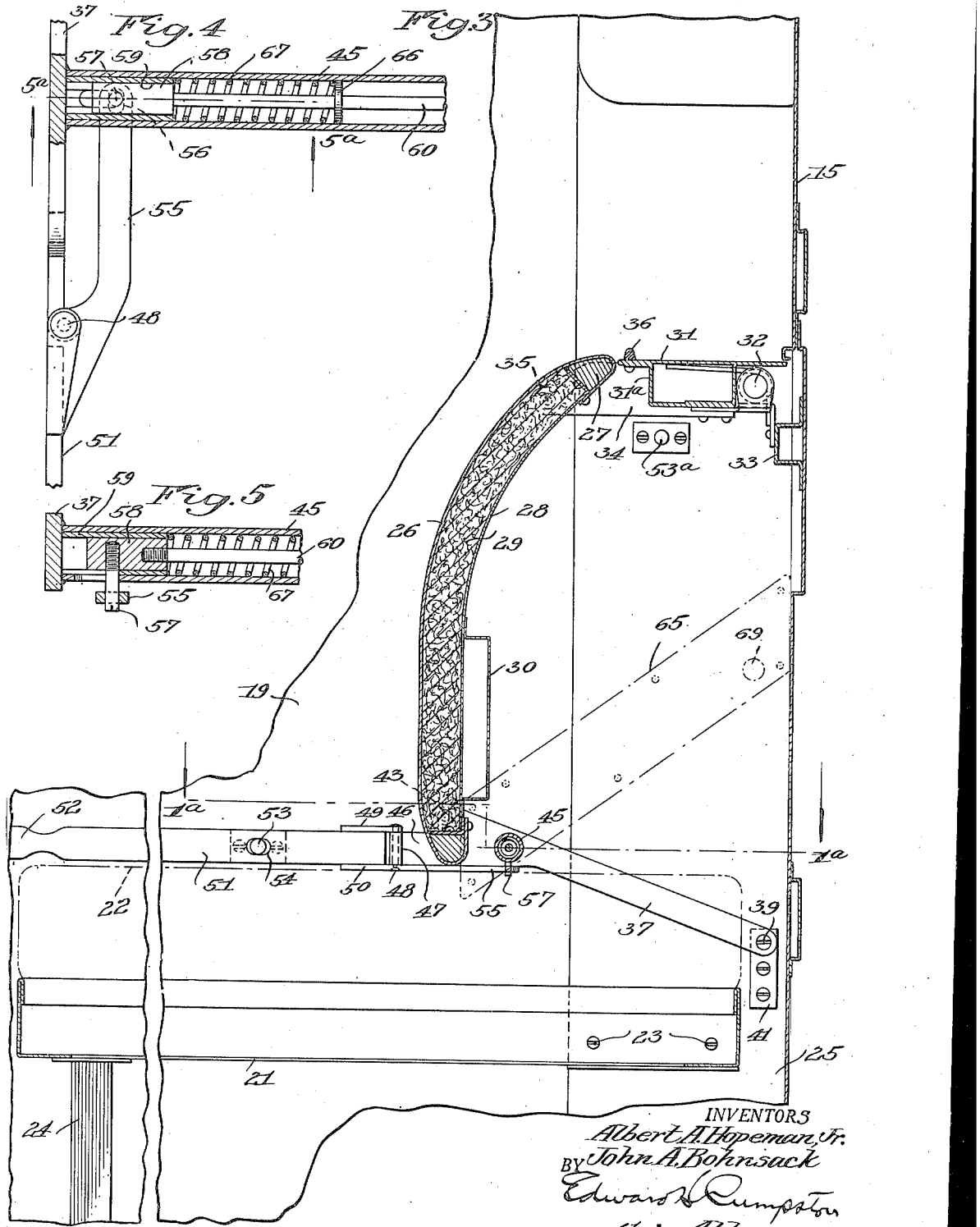

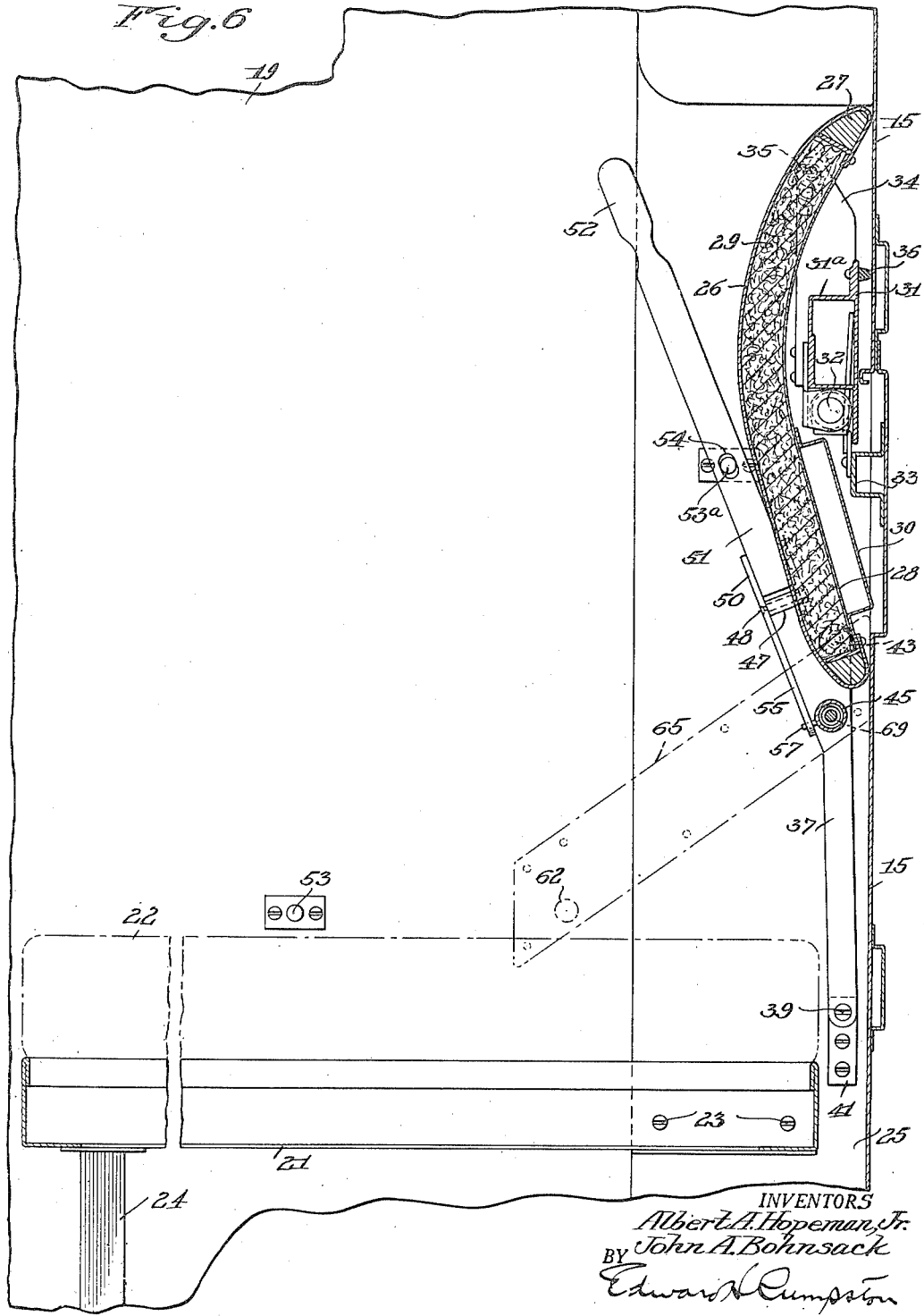

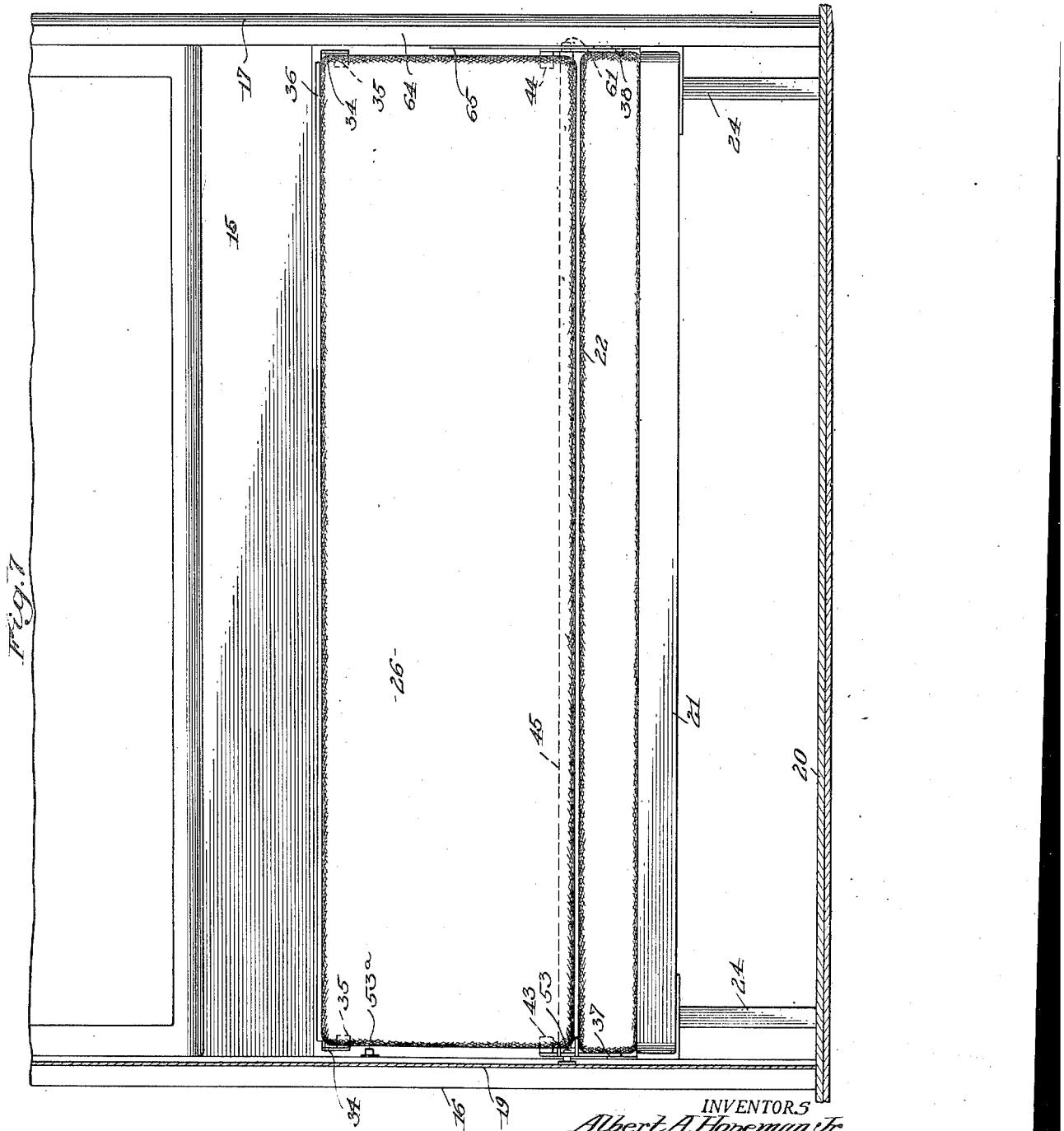

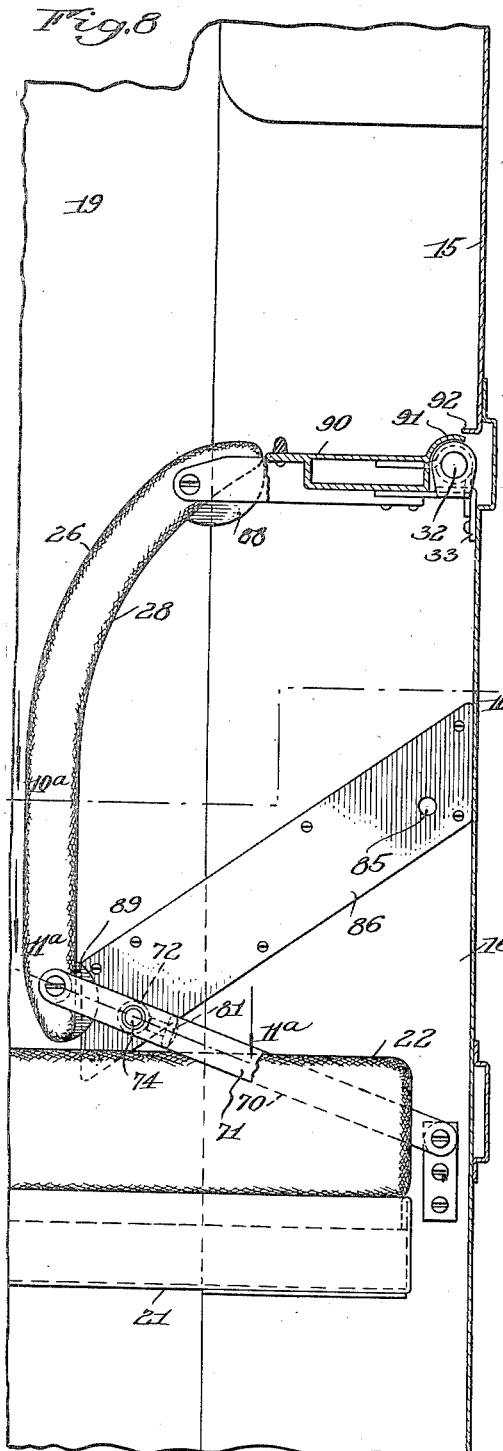
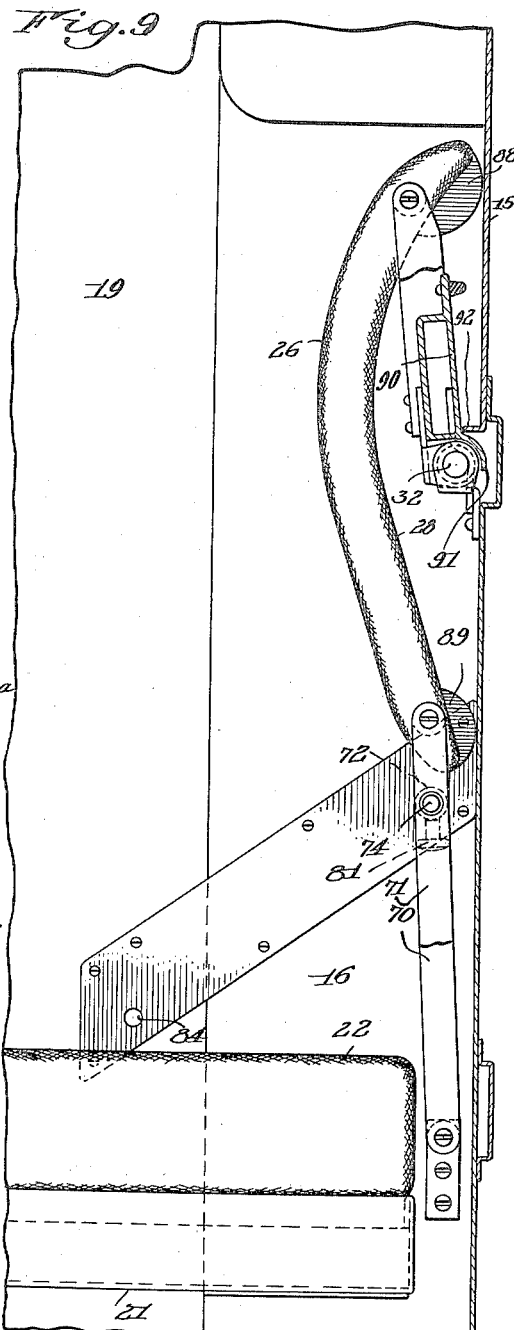

2,496,006

UNITED STATES PATENT OFFICE 2,496,006

CONVERTIBLE BED AND SEAT

Albert A. Hopeman, Jr., and John A. Bohnsack, Waynesboro, Va., assignors to Hopeman Bros., Inc., New York, N. Y., a corporation of Delaware Application December 28, 1945, Serial No. 637,593

8 Claims. (Cl. 5—59)

This invention relates to convertible beds and seats and, more particularly, to the variety thereof adapted for use in marine staterooms, railway cars and the like, one object of the invention being to provide an improved convertible bed and seat of the character referred to having a more simple, compact and conveniently operated construction.

Another object is to provide an improved convertible bed and seat of the character described in which the seat back is supported on a wall of the sleeping compartment and may be readily adjusted from a back supporting position to a position in which it is retracted clear of the bed and compactly arranged against the wall.

Another object is to provide a convertible bed and seat in which a portion of the means for adjustably supporting the seat back serves also to provide a folding article supporting shelf.

A further object is to supply an article of furniture of the above character in which the seat back is securely latched in both retracted and advanced positions as particularly desirable for application to marine and railway staterooms.

Still a further object is to provide such furnishings in a form of construction and arrangement adapted to be readily manufactured at a relatively low cost.

To these and other ends the invention resides in certain improvements and combinations of parts, all as will be hereinafter more fully described, the novel features being pointed out in the claims at the end of the specification.

In the drawings:

Fig. 1 is a sectional plan view, partly broken away, of a convertible bed and seat embodying the present invention, substantially as seen from the line 1a—1a in Fig. 3, with the seat back latched in back supporting position;

Fig. 2 is a similar view with the seat back unlatched ready for movement to retracted position clear of the bed;

Fig. 3 is an enlarged, sectional elevation substantially on the line 3a—3a in Fig. 1;

Fig. 4 is an enlarged, sectional plan substantially on the line 1a—1a in Fig. 3, showing a portion of the latching means in position for latching the seat back in back supporting position;

Fig. 5 is an enlarged, sectional elevation substantially on the line 5a—5a in Fig. 4;

Fig. 6 is a view similar to Fig. 3, but showing the seat back retracted;

Fig. 7 is a front elevation showing the seat back advanced to back supporting position;

Fig. 8 is a view similar to Fig. 3, but showing a slightly modified construction with the seat back in supporting position;

Fig. 9 is a view similar to Fig. 8, but showing the seat back in retracted position;

Fig. 10 is a plan view substantially on the line 10a—10a in Fig. 8, and

Fig. 11 is a plan view substantially on the line 11a—11a in Fig. 8.

The embodiment of the invention disclosed by way of illustration in Figs. 1 to 7, inclusive, comprises a stateroom wall or bulkhead 15, Fig. 1, having spaced hollow abutments, 16 and 17, projecting outwardly therefrom and forming a recess 18 in which the convertible bed and seat are partially received. These parts may be arranged in the corner of a compartment formed by the wall 15, abutment 16, and a wall 19 intersecting wall 15, as shown, although the recess may be formed entirely by the abutments 16 and 17, these wall parts rising from a finished floor or desk 20, Fig. 7.

The combined bed and seat is provided by a pan 21 for holding a mattress 22, the pan having one end located in the wall recess 18 and supported, at a convenient distance from the floor or deck, as by means of screws or bolts 23 extending from the sides of the pan through the wall at the sides of the recess. This inner end of the pan is spaced a small distance from the wall 15 at the back of the recess, as shown at 25, for a purpose hereafter described. The outer end of the pan is preferably supported at each corner on a tubular leg 24, resting on the finished floor or deck.

The movable seat back rest, indicated generally at 26, is preferably formed by a wooden frame 27, covered by sheet metal 28 of light gauge, with the space between the metal walls filled with suitable packing 29. The straight lower portion of the back may be reinforced by a channel-shaped member 30, as shown. The upper portion of the back is sprung or curved rearwardly, as shown, to comfortably support the occupant of the seat.

The means for movably supporting the back preferably comprises means pivotally connected to the top and bottom of the back and to the walls of the recess. Such means at the top of the back is advantageously constructed to serve also as an article supporting shelf comprising a shelf surface 31, Fig. 3, preferably made as a part of a cast metal frame 31a of rigid, box-like section. One or more spring butt-hinges 32, of any known or suitable construction, each has one flange or leaf fixed to the shelf frame 31a and the other flange fixed to a rigid channel-shaped abutment 33 fixed on the back wall 15, the hinge springs being so arranged as to tend to move the shelf upwardly. Each end of the shelf frame has an arm 34 extending forwardly and pivotally connected at 35 to the corresponding end of the back rest frame adjacent its top. At 36 is a rib extending longitudinally along the front edge of the shelf for retaining articles thereon and preferably made of rubber to serve also as a buffer or stop for engagement with the wall in the vertical position of the shelf.

The means for supporting the lower end of the back rest comprises, preferably, a pair of spaced links 37 and 38 (Figs. 1 and 3) which have their rear ends pivoted, as at 39 and 40, to brackets 41 and 42 on the side walls of the recess close to the back wall 15. The forward ends of the links are pivotally connected by any suitable means, as at 43 and 44, to the ends of the frame of the back rest. Links 37 and 38 are connected at the ends thereof adjacent the back rest by a tubular brace member 45 having its ends welded to the links. The end of the member welded to link 38 is arranged to register with an opening through the link corresponding to the opening or bore of the tubular brace, for a purpose hereafter described.

The forward end of link 37 is extended, as at 46 (Fig. 3), and reversely curved on itself to form a bearing 47. Pivotally mounted in the bearing is a pin 48 having its ends fixed in upper and lower angular bracket plates 49 and 50 welded or otherwise fixed to a bar 51 extending forwardly adjacent the outer side of the bed and formed with a handle 52, the handle bar 51 being thus pivotally connected at the bearing 47—48 with the extension 46 of the link 37.

Means are provided for latching the back rest in advanced and retracted positions comprising, preferably trunnions 53 and 53a (Figs. 1 and 3), fixed on and projecting from the brackets on the side wall of the compartment. For cooperation with these trunnions, handle bar 51 is formed with an opening 54 adapted to engage with one or the other of the trunnions in the different positions of the handle bar, respectively, the handle bar being engaged and disengaged from the trunnion by swinging it through a small angle about the pivot bearing 47—48 on the seat back link 37. This serves to latch and unlatch one end of the seat back in each of its positions.

For latching the opposite end of the seat back, flange 50 of lever 51 is extended to provide an arm 55 (Figs. 1 to 5, inclusive), the end of which is formed with a slot 56 embracing a stud 57 projecting downwardly from a cylindrical plug 58 sliding longitudinally in a sleeve 59 fixed in the end of the tubular brace member 45, the sleeve and member being slotted to permit a limited movement of the stud. Fixed at one end in the plug 58 is a rod 60 extending longitudinally in the tubular member 45 and carrying at its other end a plunger 61 sliding in the other end of the tubular member and through the registering opening in the link 38 for engagement in a keeper opening 62 (Fig. 6) in the inner wall of a hollow seat arm 64 which forms an extension of the abutment 17 and is secured thereto by means of a splicing plate 65 through which also the keeper openings extend. Rod 60 has fixed thereon a disk 66 against which bears one end of a coiled compression spring 67. The other end of the spring bears against one end of sleeve 59, so that the spring tends to move rod 60 to project plunger 61 into the keeper opening in the abutment extension 64. A similar keeper opening 69 is provided (Fig. 3) for latching the seat back in its upper position retracted against the wall 15, as shown in Fig. 6.

It will be evident from the above construction that the forward end of latch handle 51, normally lying close to the wall 19, may be swung horizontally against the tension of spring 67 through a small angle about its pin 48, from the position shown in Fig. 1 to the position shown in Fig. 2, so as to disengage trunnion 53 and disengage plunger 61 from its keeper opening, thus completely unlatching the seat back for elevating movement by means of the handle lever to the upper retracted position against wall 15 shown in Fig. 6, in which upper position it is latched by allowing the lever to latch with the upper trunnion 53a and the plunger with keeper opening 69.

The construction shown in Figs. 8 to 11, inclusive, comprises a modified latching means in which the handle lever 51 is omitted. The bottom of the seat back is movably supported, as before, by spaced links, in this case 70 and 71, which are connected by a tubular brace member 72. Both links have openings therethrough registering with the bore of the brace member. Cylindrical plungers, 73 and 74, are slidably carried in the ends of the member and the openings in the links, the plungers having operating rods, 75 and 76, respectively, fixed at their other ends to cylindrical plugs, 77 and 78, sliding in the member in spaced relation with each other. A coiled compression spring 79 is interposed between plugs 77 and 78 so as to press the latching plungers 73 and 74 outwardly and the plugs are provided with operating knobs, 80 and 81, projecting from the member through slots, 82 and 83, which limit the movements of the plungers. Plunger 73 engages in keeper openings, 84 and 85, in a plate 86, which is screwed or bolted to the abutment 16 and to the wall 19 by means of spacing thimbles 87. Plunger 74 engages in keeper openings in the opposite wall structure, the lower opening being shown at 85a and the upper opening (not shown) being arranged similarly to the opening 69 of the first modification described above.

It will be seen in this second modification that in the advanced or lowered position of the seat back shown in Fig. 8, a hand may be readily extended under the bottom of the back, by depressing the top of the mattress, to engage and press the knobs, 80 and 81, toward each other, thereby simultaneously withdrawing the latching plungers 73 and 74 from engagement with their keeper openings in the side walls of the depression and releasing the seat back so that it can be moved upwardly to its retracted position against wall 15, in which position the latching plungers snap into the keeper openings so as to securely hold the seat back in such position. In lowering the back, knobs 80 and 81 are readily accessible for releasing operation and the top of the back is engaged and pulled downwardly to move the back to its lowered or advanced position.

To avoid any possibility of pinching the fingers of the operator during the movements of the back, as shown in Figs. 8 to 11, inclusive, its rear side is provided at top and bottom with rounded projections, 88 and 89, respectively, tending to close the gaps between the back of the shelf 90 and brace member 72, the back of the shelf in this modification having a rounded extension 91 closing the gap between the spring hinge 32 and the flange 92 of the back wall 15. These rounded extensions on the seat back and shelf serve to exclude the fingers of the operator from these gaps between the parts so as to prevent them from being pinched during the movement of the back. In both modifications the seat back is finished by a detachable fabric covering as indicated in Figs. 7, 8 and 9, but omitted for clarity in the remaining views, such covering forming no part of the invention.

In case the bed and seat are not located adjacent a transverse wall, such as 19, a second hollow seat arm is attached to wall abutment 16, like the arm 64 at the other end of the seat but longer, if necessary, so as to support the trunnion 53, or provide the keeper opening 84.

The operation of the equipment has been explained in connection with the above description of its construction, and it will be evident that the invention supplies, in each modification, a simple, compact and conveniently operated coordination and arrangement of parts in which the seat back is readily adjustable to and from an inoperative position compactly disposed against the wall of the compartment. In lowered position the means for adjustably supporting the top of the back is advantageously utilized to provide a convenient shelf for holding articles of personal equipment, bedding supplies or the like. The back is firmly supported and guided in its movements by its shelf means and by a separate link at each end of its bottom, and is firmly secured in each adjusted position by conveniently operated latch means, so as to particularly adapt the construction for use on board a ship subject to rolling on the high seas and on railway cars subject to the vibrations and shocks of transportation.

It will thus be seen that the invention accomplishes its objects and while it has been herein disclosed by reference to the details of preferred embodiments, it is to be understood that such disclosure is intended in an illustrative, rather than a limiting sense, as it is contemplated that various modifications in the construction and arrangement of the parts will readily occur to those skilled in the art, within the spirit of the invention and the scope of the appended claims.

We claim:

1. A convertible bed and seat comprising supporting means, a combined bed and seat, a seat back rest, an article receiving shelf pivotally connected with said back rest adjacent its top and with said supporting means, spaced links pivotally connected with the ends of said back rest adjacent its bottom, respectively, and with said supporting means, whereby said back rest is movable from an elevated position retracted against said supporting means to and from an advanced back supporting position above said bed and seat with said shelf in horizontal supporting position, a tubular brace member connecting said links, and latch means slidably mounted in said tubular member for latching engagement with said supporting means to secure said back rest in retracted and advanced positions.

2. A convertible bed and seat comprising supporting means, a combined bed and seat, a seat back rest, means pivotally connected with said back rest adjacent its top and with said supporting means, spaced links pivotally connected with the ends of said back rest adjacent its bottom, respectively, and with said supporting means, whereby said back rest is supported for movement from an elevated position to and from an advanced back supporting position above said bed and seat, a brace member connecting said links, latch means movable on said member for latching engagement with said supporting means to secure said back rest in retracted and advanced positions, and manually operable means for actuating said latch means.

3. A convertible bed and seat comprising supporting means, a combined bed and seat, a seat back rest, means pivotally connected with said back rest adjacent its top and with said supporting means, spaced links pivotally connected with the ends of said back rest adjacent its bottom, respectively, and with said supporting means, whereby said back rest is movable from an elevated retracted position to and from an advanced back supporting position above said bed and seat, a brace member connecting said links, latch means slidable on said member for latching engagement with said supporting means to secure said back rest in retracted and advanced positions, and a handle movably connected with one of said links and with said latch means for movement in one direction to actuate said latch means and for movement in another direction to raise and lower said back rest.

4. A convertible bed and seat comprising supporting means, a combined bed and seat, a seat back rest, means pivotally connected with said back rest adjacent its top and with said supporting means, spaced links pivotally connected with the ends of said back rest adjacent its bottom, respectively, and with said supporting means, whereby said back rest is supported for movement from an elevated retracted position against said supporting means to and from an advanced back supporting position above said bed and seat, spring means for counterbalancing the weight of said back rest, latch means for securing said back rest in retracted and elevated positions, and a handle pivotally connected with one of said links and movable in one direction to actuate said latch means and movable in another direction to move said back rest.

5. A convertible bed and seat comprising supporting means, a combined bed and seat, a seat back rest, means pivotally connected with said back rest adjacent its top and with said supporting means, spaced links pivotally connected with the ends of said back rest adjacent its bottom, respectively, and with said supporting means, whereby said back rest is movable from an upper retracted position against said supporting means toward and from a lower advanced position above said bed and seat to serve as a back rest, a tubular brace member connecting said links, latching plungers slidable in the ends of said member for latching engagement with said supporting means for securing said back rest in retracted and advanced positions, spring means for advancing said plungers, and manually operable means for retracting said plungers.

6. A convertible bed and seat comprising a wall having a recessed portion, a combined bed and seat having one side thereof positioned in said recessed portion, a seat back rest, an article supporting shelf pivotally connected with said back rest adjacent its top and with said wall at the back of said recessed portion, spaced links pivotally connected with the opposite ends of said back rest adjacent its bottom and with said wall at the sides of said recessed portion, respectively, whereby said back rest is movable from a retracted position at the back of said recess to and from supporting position above said bed and seat with said shelf in horizontal supporting position, spring means counterbalancing said back rest, a tubular bracing member connecting said links, spring actuated plunger means slidable in said member for latching engagement with said wall at a side of said recessed portion, and manually operable means for actuating said latch means.

7. A convertible bed and seat comprising supporting means, a combined bed and seat, a seat back rest, means pivotally connected with said back rest adjacent its top and with said supporting means, spaced links pivotally connected with the ends of said back rest adjacent its bottom, respectively, and with said supporting means, whereby said back rest is movable from an upper retracted position against said supporting means toward and from a lower advanced position above said bed and seat to serve as a back rest, a tubular brace member connecting said links, latching plungers slidable in the ends of said member for latching engagement with said supporting means for securing said back rest in retracted and advanced positions, spring means for advancing said plungers, and a handle pivotally connected with one of said links and movable in one direction to actuate said latching plungers and movable in another direction to move said back rest.

8. A convertible bed and seat comprising a wall having a recessed portion, a combined bed and seat having one side thereof positioned in said recessed portion, a seat back rest, an article supporting shelf pivotally connected with said back rest adjacent its top and with said wall at the back of said recessed portion, spaced links pivotally connected with the opposite ends of said back rest adjacent its bottom and with said wall at the sides of said recessed portion, respectively, whereby said back rest is movable from a retracted position at the back of said recess to and from supporting position above said bed and seat with said shelf in horizontal supporting position, spring means counterbalancing said back rest, a tubular bracing member connecting said links, spring actuated plunger means slidable in said member for latching engagement with said wall at a side of said recessed portion, and a handle pivotally connected with one of said links and movable in one direction to actuate said plunger means to release said back rest and movable in another direction to move said back rest from one to another of said positions thereof.

ALBERT A. HOPEMAN, Jr.
JOHN A. BOHNSACK.

REFERENCES CITED

The following references are of record in the file of this patent:

UNITED STATES PATENTS

| Number | Name | Date |
| --- | --- | --- |
| 1,032,543 | Henry | July 16, 1912 |
| 1,074,799 | Kindel | Oct. 7, 1913 |
| 1,288,682 | Richardson | Dec. 24, 1918 |
| 1,326,295 | Sims | Dec. 30, 1919 |
| 1,334,768 | Luppino | Mar. 23, 1920 |
| 1,344,825 | Schram | June 29, 1920 |
| 2,394,969 | Robinson | Feb. 12, 1946 |